United States Patent [19]

Matsuoka

[11] Patent Number: 4,505,117
[45] Date of Patent: Mar. 19, 1985

[54] TURBOCHARGED INTERNAL COMBUSTION ENGINE HAVING AN ENGINE DRIVEN POSITIVE DISPLACEMENT COMPRESSOR

[75] Inventor: Hideaki Matsuoka, Decatur, Ill.

[73] Assignee: Warner-Ishi, Decatur, Ill.

[21] Appl. No.: 386,040

[22] Filed: Jun. 7, 1982

[51] Int. Cl.³ ............................................. F02B 37/04
[52] U.S. Cl. ...................................................... 60/609
[58] Field of Search ................................. 60/609, 610

[56] References Cited

U.S. PATENT DOCUMENTS

| | | | |
|---|---|---|---|
| 2,296,268 | 9/1942 | Buchi | 60/610 |
| 2,306,277 | 12/1942 | Oswald | 60/609 X |
| 3,335,563 | 8/1967 | Kitchen | 60/609 X |
| 3,921,403 | 11/1975 | McInerney et al. | 60/609 |
| 4,258,550 | 3/1981 | Hinkle et al. | 60/609 X |

FOREIGN PATENT DOCUMENTS 849782  9/1952  Fed. Rep. of Germany ........ 60/609

*Primary Examiner*—Michael Koczo
*Attorney, Agent, or Firm*—Fitch, Even, Tabin & Flannery

[57] ABSTRACT

An internal combustion engine including a turbocharger and a controller for the turbocharger. The engine has an air intake to receive a charge of compressed air while the turbocharger includes a compressor connected to the air intake. The turbine is connected to and driven by exhaust gases of the engine and drives the compressor. The controller limits the pressure of the compressed air charge to below a predetermined pressure at high engine speed. The engine further includes a positive displacement compressor connected to the inlet of the turbocharger compressor to supply compressed air at low engine speeds, and a direct drive for the positive displacement compressor. The drive is selectively operable and able to be selectively disabled. The engine also includes a second controller for limiting the combined air pressure when both compressors are operated at below the predetermined pressure level and to disable the direct drive and the positive displacement compressor when the turbocharger is supplying a compressed air charge at a desired pressure level.

10 Claims, 14 Drawing Figures

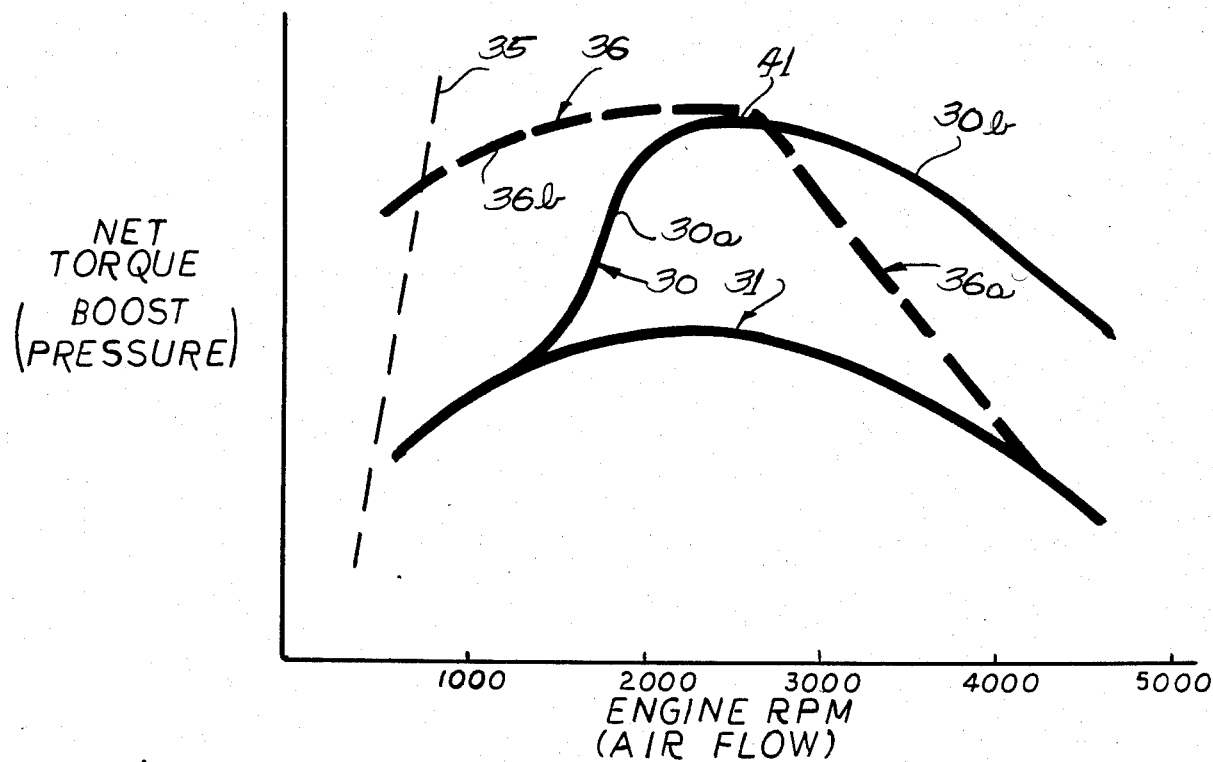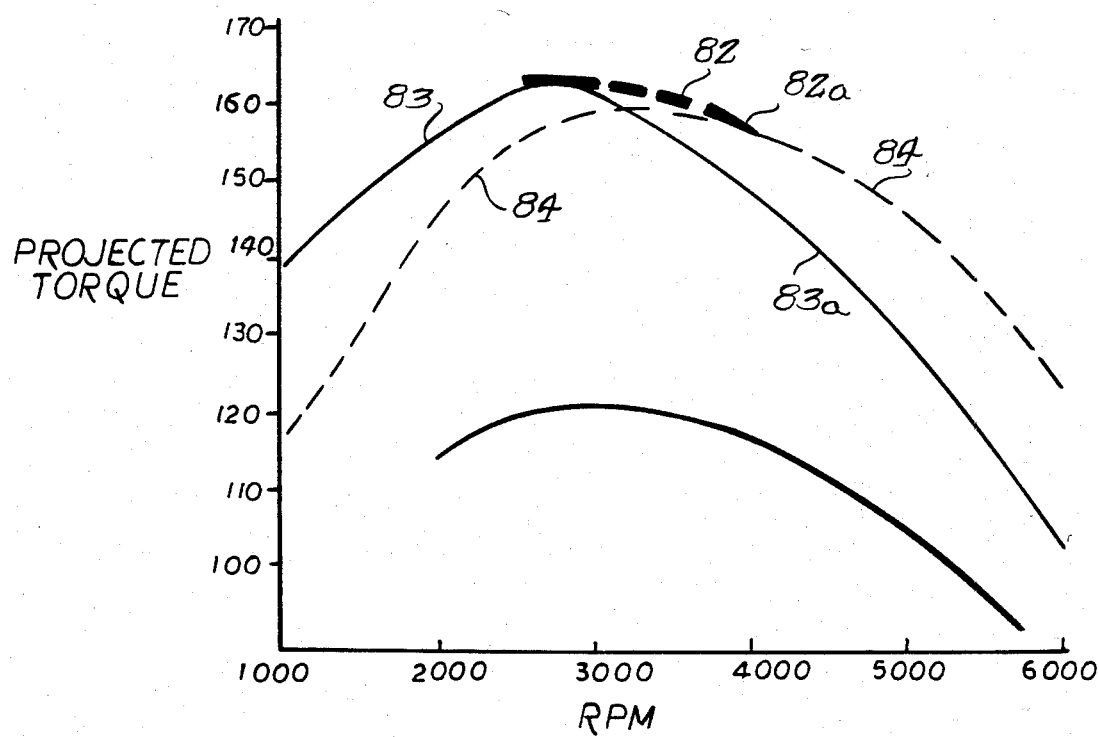

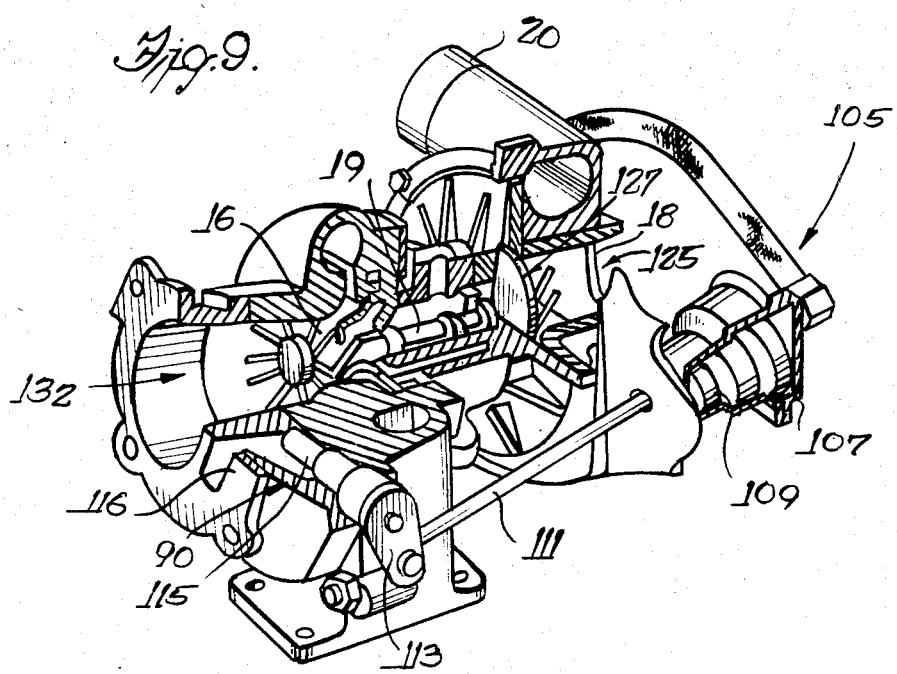
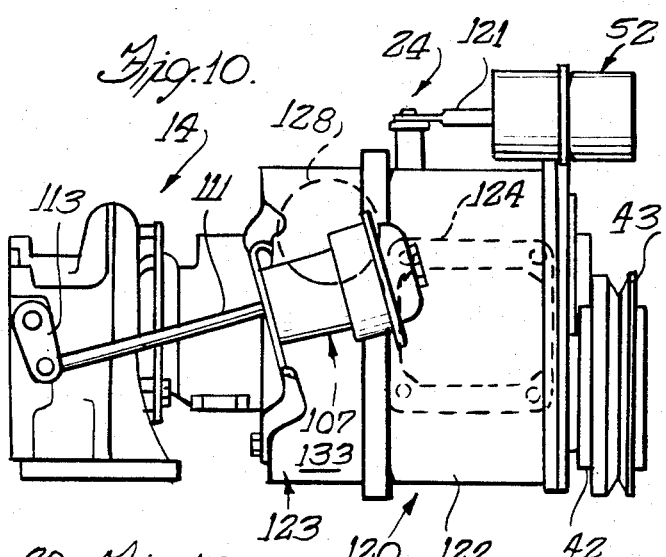
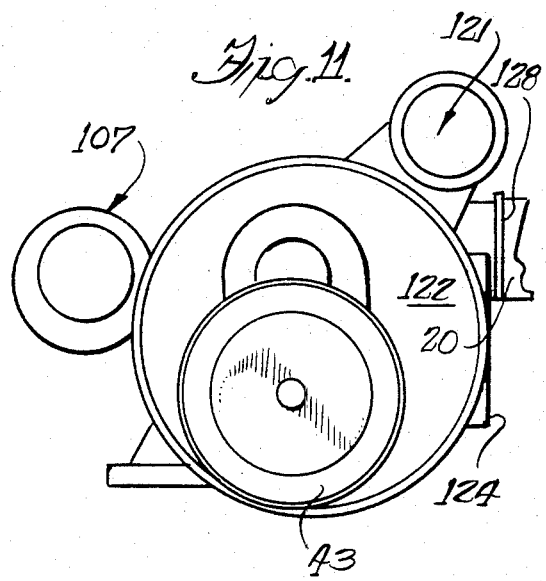
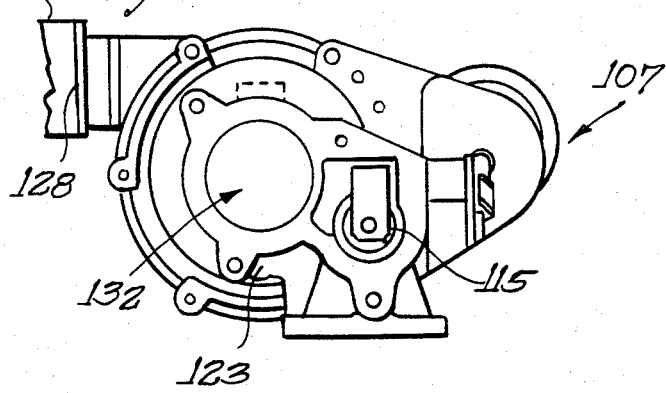

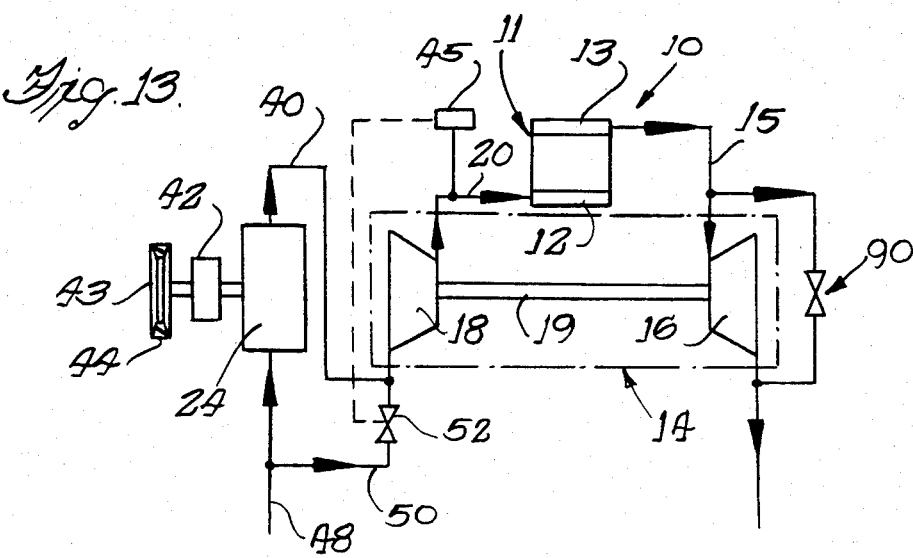

TURBOCHARGED INTERNAL COMBUSTION ENGINE HAVING AN ENGINE DRIVEN POSITIVE DISPLACEMENT COMPRESSOR

BACKGROUND OF THE INVENTION

This invention relates to a method and apparatus for providing a compressed air charge, i.e. boost pressure, to an internal combustion engine by an air compressor called a supercharger and by a turbocharger which includes another air compressor driven by a turbine driven by exhaust gases from the engine.

The present invention is directed to the effective combination of a supercharger and turbocharger with an internal combustion engine to provide a power system for a vehicle or the like with reasonably competitive fuel efficiency, horsepower and torque. While the present invention is not limited to use only in vehicles, it will be described in connection therewith as that is its preferred useage. In some vehicles, a supercharger (which is driven directly by the engine) is used to provide boost pressure without the use of a turbocharger. In other vehicles, only a turbocharger is used for the reason that it is not directly driven by the engine and therefor significantly reduces the fuel consumption of the engine when compared to a supercharger.

The present invention is particularly directed to the elimination of the so-called "turbo lag" which results from the fact that the turbocharger does not provide sufficient of boost pressure until the automotive engine has speeded up to several thousand revolutions per minute; and this means a few seconds in delay i.e., a lag in achieving the extra torque to accelerate the vehicle quickly. Thus, when the turbocharged vehicle is being called upon for rapid acceleration, as is typical for an automotive vehicle to move from a dead stop, the extra torque needed is not available. A conventional automotive vehicle needs sufficient torque to bring it rapidly to driving speed and the driver will not tolerate a few seconds wait for the turbo lag to be overcome by the turbocharger, if the turbocharger is to provide the extra torque for a fast start.

The combination of both a supercharger and a turbocharger to provide boost to an engine has been heretofore proposed, as for example, in Buchi Pat. No. 2,296,268. This patent discloses a centrifugal supercharger which is continuously driven and supplying boost pressure first to the engine manifold directly through one pipe. Then when the turbo charger is delivering more boost pressure to the engine than the supercharger, the excess pressure forces a vaned damper to close and redirect the flow of the supercharger into and through the turbocharger. In the centrifugal compressor, air will recirculate within the centrifugal compressor and cause a significant load that will decrease the efficiency of the system even when the damper valve is closed in the air conduit between the supercharger and the turbocharger. The supercharger uses considerable power at high engine speeds.

Kitchen U.S. Pat. No. 3,335,563 discloses a turbocharger which delivers a compressed air charge through the supercharger to the intake manifold of the vehicle engine. Both U.S. Pat. Nos. 2,296,268 and 3,335,563 disclose relatively inefficient systems in that the supercharger operates continuously; and, at higher engine speeds will consume considerable horsepower. Such use of horsepower detracts significantly from the fuel efficiency.

A further discussion of the use of a combination of a turbocharger and supercharger with an internal combustion engine is disclosed in McInerney, et al., U.S. Pat. No. 3,921,403 in which a supercharger is used to supply boost pressure when the engine throttle is rapidly opened to reduce the amount of exhaust smoke emanating from the engine during acceleration. In this particular patent, the engine directly drives a fluid pump which in turn drives a fluid motor connected to the supercharger. The fluid pump and fluid motor are constantly driven, and hence, use considerable horsepower at higher engine speeds. This patent discloses a further embodiment with a continuously driven fluid pump, which drives the fluid motor to turn the supercharger until the turbocharger operates sufficiently and then the pump drives a fluid motor operating a fan for circulating air about an after-cooler. Again, while the burst or puff of smoke may be eliminated during acceleration, fuel efficiency is lacking because of the continuous and direct drive of the fluid pump and the fluid motors directly by the engine at all engine speeds. The use of fluid pumps and fluid motors results in increased expense and size for the system making the system unsuitable for automotive use. Further, each of the fluid pumps and fluid motors have its own inefficiency to make the overall system less efficient than a simple direct drive belt or the like. The diesel engine disclosed in U.S. Pat. No. 3,921,403 also appears to be used for a relatively narrow range of speeds in an industrial application because its turbocharger does not appear to have a wastegate valve which is used with turbochargers for the widely varying loads and speeds such as encountered in automotive use.

The present invention is particularly directed to providing a supercharged and turbocharged system for use with a vehicle engine so that a small internal combustion engine may act as a larger engine of increased horsepower during rapid acceleration, but which is also able to achieve the economy of fuel conservation by use of the turbocharger alone at higher engine speeds. Unlike industrial diesel applications in which the supercharged or turbocharged engine is only for a specific narrow speed and/or load range, the present invention is useable with the widely varying speed and load conditions encountered with vehicle propulsion. To be commercially feasible, the system should have the supercharger and turbocharger interrelated to each other and to the engine to achieve fuel economy while providing the increased horsepower and torque from the boost pressure provided to the engine. For conventional automobiles used for general public useage, to which the present invention is primarily directed, the cost of the system should be low in contrast to race vehicles where exotic and costly systems have heretofore been used.

Accordingly, a general object of the present invention is to provide a new and improved internal combustion engine system employing a supercharger and turbocharger.

Another object of the invention is to provide a new and improved supercharger and turbocharger system for use with internal combustion engines used to power conventional, mass produced automobiles and trucks.

These and other objects and advantages of the present invention will become apparent from the following detailed description taken in conjunction with the accompanying drawings in which:

FIG. 4 is a graph for illustrating net torque produced by the invention at different engine speeds when using turbochargers and superchargers.

FIG. 5 is a graph illustrating projected torque with changes in engine speed for engines employing turbochargers and superchargers.

FIG. 9 is a perspective view of a turbocharger for use with the invention.

FIG. 10 is a side elevational view of a combined supercharger and turbocharger unit constructed in accordance with the preferred embodiment of the engine.

FIG. 11 is a right hand end view of the unit of FIG. 10.

FIG. 12 is a left hand end view of the unit of FIG. 10.

FIG. 13 is a diagramatic view of a supercharger and turbocharger similar to that shown in FIG. 1 with a pressure sensing device rather than a speed sensing device.

Figure 1:
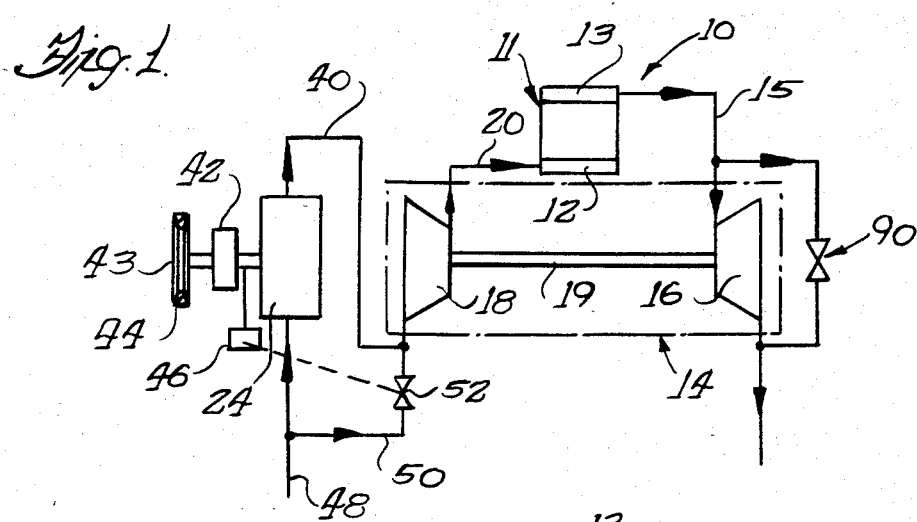
FIG. 1 is a diagramatic view of a supercharger and turbocharger system embodying the novel features of the invention.

As shown on the drawings for purposes of illustration, the invention is embodied in a method of and apparatus for providing boost pressure to an internal combustion engine 11 which may be of conventional design and which may be either a gasoline engine employing spark plugs or a diesel engine.

The present invention is not limited to use in automobiles or trucks and can be used for boats, stationary power plants, etc., but its fuel economies and torque relationships all will be described in connection with its primary intended use, that is in automobile vehicles. The engine 11 has intake manifolds 12 which receive a compressed air charge from the system which forces a greater mass of air at enhanced pressures through the cylinders than will be present with a normally aspirated engine. A turbocharger 14 is connected to an engine exhaust manifold 13 by a conduit 15 which conveys exhaust gases from the engine cylinders to turn a turbine 16 which drives a compressor 18, typically through a common shaft 19, extending between the turbine and the compressor. At relatively high engine speeds, the turbocharger compressor 18 will be compressing and delivering substantially all of the air to the intake manifold of the engine through conduit 20 and hence will be turbocharging the engine. The preferred supercharger 24 may be directly driven by the engine so that the supercharger 24 turns at a rate directly proportional to engine speed.

The preferred supercharger 24 is a positive displacement compressor or blower which pumps substantially the same for each complete revolution of the engine irrespective of the change of speed of the engine. Positive displacement compressors used in superchargers typically use a piston, vane or lobe as an air moving component. The positive displacement supercharger is in contrast to the dynamic type of compressors which are inherently high-speed devices operating at very high speeds to accelerate the gas to high velocity and then slow the gas velocity quickly to obtain gas compression. In dynamic compressors; the pressure varies significantly with engine speed unlike the preferred positive displacement compressor 24 used herein.

As can best be understood in connection with a review of FIG. 4, a typical turbocharger, such as shown in FIG. 9, when connected to a gasoline or diesel engine provides an increase in net torque from the engine, as shown by the line 30, when the engine speed increases to several thousand revolutions per minute with the turbocharger having little or no effect below 1500 r.p.m.'s in this instance. The line 31 shows the net torque or boost for a naturally aspirated engine with increased engine speed. The turbocharger is ineffective at low engine speeds or light loads because the exhaust gases are not enough and are not providing sufficient energy to overcome inertia of the rotatable parts of the compressor and turbine and to rotate the compressor at sufficient speed to produce the compression to provide the boost pressure to the engine which occurs very rapidly between about 1500 to 2500 engine r.p.m. for the gasoline engine performing as indicated in FIG. 4 and accounts for the rapid increase in net torque shown by the line section 30a in FIG. 4. In contrast, the net torque from the naturally aspirated engine increases only very gradually from 1500 to 2500 r.p.m. as shown by line 31 in FIG. 4.

As will be apparent to persons familiar with turbocharger performance, turbochargers should not be used at engine speeds and net torques to the left of a surge line 35, FIG. 4, because the output of the turbocharger may be pulsating and vibrations may be occurring which are very detrimental to the turbocharger. FIG. 4 is actually two separate graphs combined together, with only surge line 35 for the turbocharger relating to the second set of coordinates, namely "Boost Pressure" and "air flow". The first sets of coordinates of "Net Torque" and "Engine RPM" relate the curves 30, 31 and 36. The surge line 35 was developed in a manner similar to the surge line 81 in FIG. 6a which also has boost pressure and air flow for its coordinates. The superposition of the surge line 35 on FIG. 4 illustrates operation of the supercharger in the region to the left of the surge line 35 for the turbocharger whereas the turbocharger is ordinarily not useable under conditions corresponding to locations to the left of the surge line 35. While the turbocharger is a fairly efficient device at a higher engine speed, it is relatively ineffective at lower engine speeds, e.g. below 1500 r.p.m. in FIG. 4, in providing a net torque for the power engine.

Referring to FIG. 4, the engine when boosted by the supercharger 24 provides a net torque as shown by the dotted line 36, which is effective at substantially below 1000 r.p.m. and continues to be effective to about 2500 r.p.m. (line segment 36b) after which the effectiveness of the supercharger net torque boost decreases (line segment 36a) and drops off rapidly. The supercharger may be effective to the left of the surge line where the turbocharger should not be operated. Because the supercharger is directly driven from the engine, typically being a belt or other type of direct drive from the engine crankshaft, the horsepower used by the supercharger increases substantially at high speeds with a decreasing net torque boost.

In accordance with the present invention the new and improved supercharger and turbocharger system 10 is provided with the supercharger 24 operating at low engine speeds to provide the boost pressure and net torque to make the engine overcome turbo lag and with the more efficient turbocharger 14 being used at higher speeds with the supercharger and its power drive being effectively disabled and being prevented from using significant horse power of the engine at these higher engine speeds. The supercharger 24 delivers its boost pressure over output conduit 40 (FIG. 1) to turbo compressor 18 with the charge flowing through the latter and over a discharge conduit 20 to the engine intake manifold 12. That is, the compressed air charge flows from the supercharger and through the compressor 18 at low engine speeds with the compressor 18 supplying little of the boost pressure. Thus, with the present invention, the net torque (line segment 36b in FIG. 4) produced by the engine 11 will be substantially above the normally aspirated engine torque designated by the line 31 as the engine is accelerated from 1000 to 2500 r.p.m. This increase in net torque at low engine speeds overcomes the turbo lag problem.

The turbocharger 14 will begin supplying the net torque as indicated by the line section 30a in FIG. 4 with the net torque increasing substantially beginning at about 1200 r.p.m. to 2500 rpm where at point 41 the net torque will all be from the boost supplied by the turbocharger 14 and the supercharger 24 will be disabled, e.g., by being declutched from its engine drive. Thus, the net torque and the boost pressure will be achieved by the turbocharger boost alone, as designated by line segment 30b, after about 2500 rpm for an engine having the characteristics illustrated in FIG. 4.

In accordance with an important aspect of the present invention, the supercharger 24 is disconnected or effectively disabled as the turbocharger 14 becomes effective such as by operation of clutch 42, FIG. 1, which is connected to a pulley 43 driven by a belt 44 which would extend to the fan belt drive or other direct engine drive of a typical automotive gasoline or diesel engine. Thus, as the engine 11 turns at greater and greater speed, the pulley 43 drives the supercharger through the electromagnetic clutch 42 at a faster and faster speed which will provide the increasing net torque or horsepower up until a predetermined limit, for example 2500 to 2800 rpm in the examples shown in FIGS. 4 and 5. At this time either a pressure switch 45 in FIG. 1 or a revolution counter 46 in FIG. 13 is effective to cause operation of the electromagnetic clutch 42 to disconnect the supercharger from the direct drive by the pulley 43 and belt 44. At this time the ambient air which had been entering over line 48 to the supercharger 24 may flow through a line 50 and control valve 52 directly to the compressor 18 for providing the compressed air charge to the engine 11 exclusively.

It is to be appreciated that the turbocharger 14 is more energy efficient in that it utilizes the exhaust gases from the engine with no direct mechanical drive connection to the engine.

Figure 6:
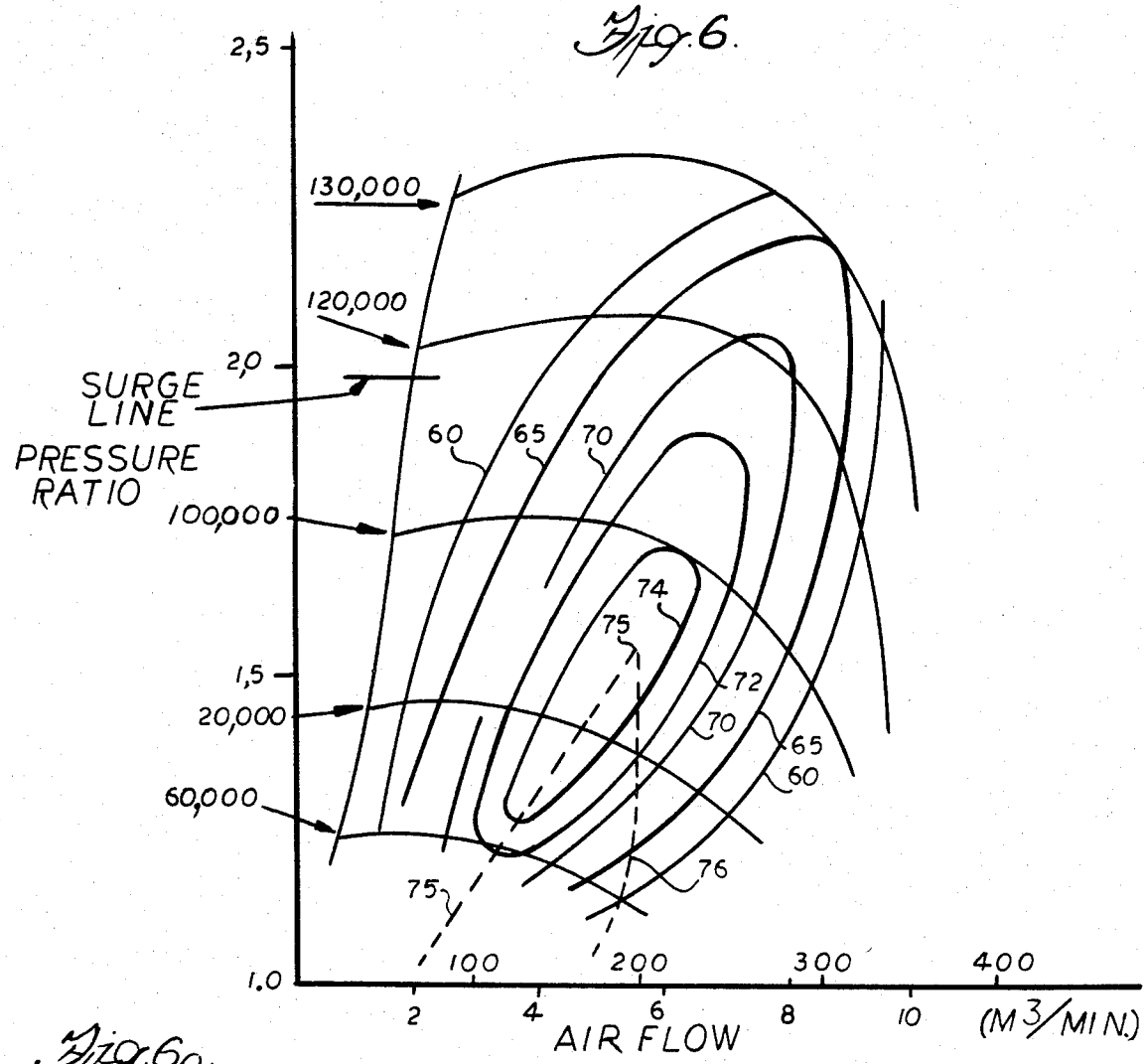
FIG. 6 is a schematic diagram showing efficiencies for a compressor at different pressure ratios and airflows.

The particular relationship of the present engine relative to fuel consumption and the particular desireability of having the flow from the supercharger 24 flow through the compressor 18 of the turbocharger 14 rather than in the opposite manner as suggested in several patents will now be considered in connection with FIG. 6. The latter shows a well-known map of compressor performance showing islands designated by percent efficiency. For example, the upper and lower curved lines designated 60 represent 60 percent efficiency and are the outermost encircling line segments. The efficiency encircling lines 60 encompasses the largest area. Within the 60 percent area are several other progressively smaller areas with the smallest area being designated "74". Thus, the efficiency of the compressor can be readily ascertained for a given pressure ratio and air flow by locating a point therefor in FIG. 6 and ascertaining the highest island efficiency area that the point falls within.

As will be explained in connection with FIG. 6, it is most desireable to operate within the narrow map or island designated 74 in FIG. 6 for 74 percent efficiency. On the well-known map of efficiency for a turbocharger, as shown in FIG. 6, a relatively straight line 75 has been added to represent the operation of the turbocharger 14 receiving a compressed air charge from the supercharger 24. The air from the supercharger will be compressed to have a greater density than the ambient air. This will have no effect on the plotting of line 75 for the reason that the ordinate in FIG. 6 is, directed to a ratio of pressures, i.e., the ratio of outlet pressure to inlet pressure for the compressor 18 of the turbocharger, rather than to absolute pressure. Also, it is to be understood that FIG. 6, as well as FIGS. 4, 5, 6a, 7 and 8, illustrate conditions at wide open throttle and maximum load for the engine. Naturally, for lesser fuel and load conditions, the curves will differ from the full throttle and load conditions used herein to illustrate the invention. Like the usual efficiency map, the map of FIG. 6 was developed at standard test conditions including a standard air inlet temperature, as is well known in the art. Although the supercharger will be exhausting air heated to a higher temperature than standard test temperatures at the inlet to the compressor 18, this effect of a higher temperature may be ignored for this discussion. The line 76 illustrates the turbocharger performance when the turbocharger 14 has been switched to deliver compressed air to the supercharger. The line 75 shows that turbocharger 14 will be achieving the higher efficiency of 74 percent faster and at a lower pressure ratio, e.g., about 1.25 in FIG. 6 than a pressure ratio of almost 1.5 for the line 76. When supercharger 24 supplies the denser air to the turbocharger 14, the air density is higher, but for given mass of air, the air flow at the turbocharger inlet will be smaller. This is because air flow is equal to the mass of air divided by air density. Thus, for the same mass of air the higher density divided into the mass results in a smaller air flow. The curves 75 and 76 show that better efficiency is achieved with the supercharger supplying compressed air to the turbocharger rather than in the opposite manner as disclosed in some prior patents.

Furthermore, it is best to have the more efficient turbocharger 14, i.e. from a fuel economy standpoint, operate at high engine speeds and loads where more air is being compressed and delivered to the engine than at lower speeds and loads. By way of example, if the supercharger delivers compressed air while the engine speed and air flow are low, as shown by the curved line 36 in FIG. 4, it then can be disabled and allow the more efficient turbocharger 14 to operate, as shown by line 30b in FIG. 4 for the higher engine speeds and greater air flows. Also, it is preferred that the turbocharger be operating for greater periods of time, for example, over the major portion of the operating range of the engine rather than as the supercharger does during acceleration from low engine speeds or deceleration to low engine speed range. By way of example only, the illustrated supercharger 24 may be sized smaller, if it is to handle only the smaller flow rates of air, e.f., about one-fourth the size that it would be if it were to supply all of the air flow to the engine at maximum engine speed and maximum air delivery to the engine. Preferably, the turbocharger 14 is constructed with the turbine housing larger than usual so as to handle larger air flows at the higher engine rpm's with the wastegate valve size minimized as compared to a conventional turbocharger not used in combination with a supercharger.

Figure 8:
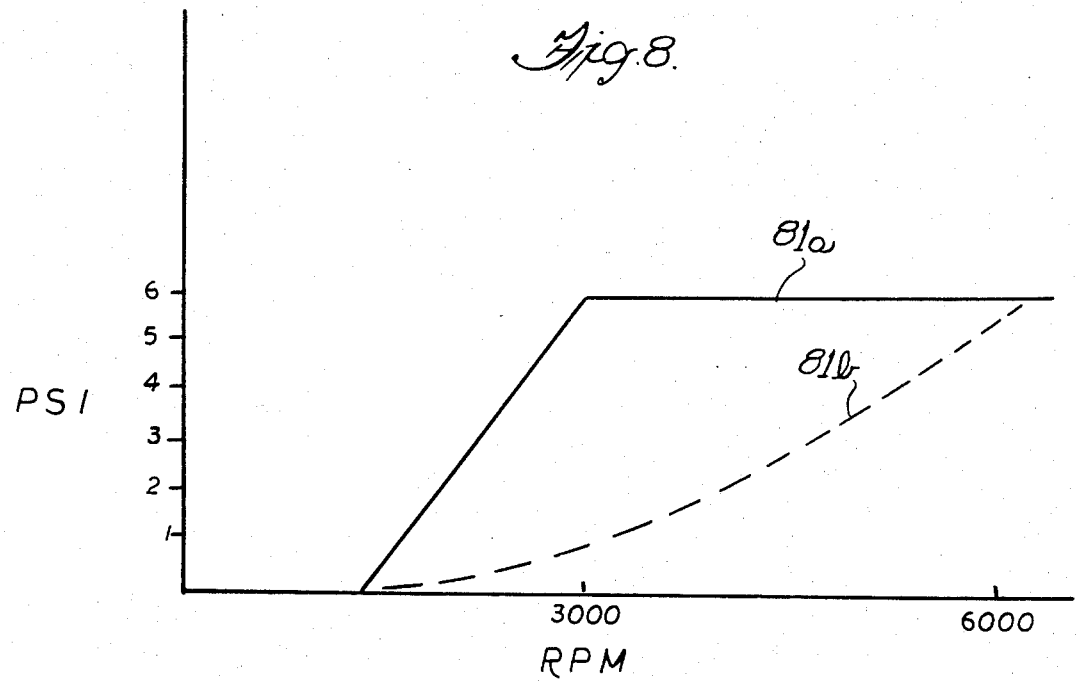
FIG. 8 is a diagramatic illustration of the effectiveness of using a compressor having a wastegate valve with changes in boost pressure with engine speed.

The preferred and illustrated embodiment of the invention employs a conventional turbocharger such as sold by Warner-Ishi of Decatur, Ill. which employs a "wastegate valve" 90 (FIG. 9) which opens at a predetermined pressure, such as, for example, 6 pounds per square inch boost pressure. The preferred turbocharger includes a pressure sensing means 105 having an air pressure actuater 107 which includes a bellows 109 to move a rod 111 to turn a crank 113 to turn a valve member 115 in an exhaust relief port 116 which discharges to atmosphere. As will be explained in connection with FIG. 7 and 8, the preferred turbocharger 14 with a wastegate valve 90 supplies all the boost pressure above a predetermined pressure e.g. 5 psi up to a maximum boost pressure at 6 psi when the engine is at 3000 rpm in this example. The wastegate valve 90 is open with continued engine acceleration from, for example, 3000 to 6000 rpm and the flat line segment 81a indicates a constant 6 psi maximum boost pressure for the engine as shown in FIG. 8. As known, without the wastegate valve 90 and narrowed nozzle used in the turbine, the turbine would provide an increase in boost pressure at a much slower rate, e.g., as shown by the dotted line 81b. The use of wastegate for the turbocharger 14 provides benefits that should be readily understood to those skilled in the art.

Figure 6A:
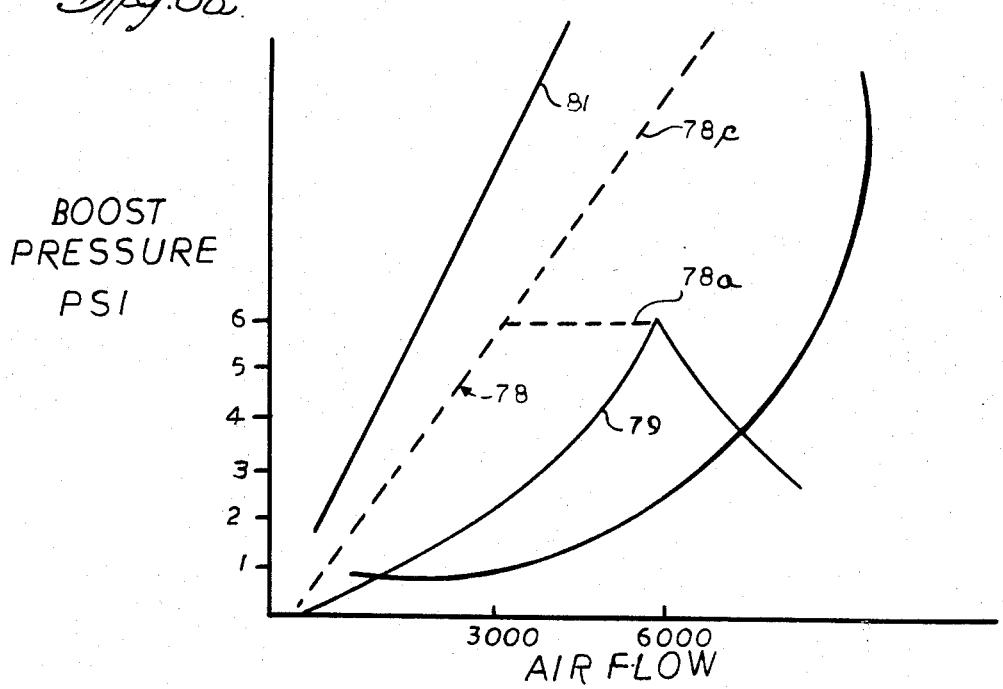
FIG. 6a is a diagram illustrating changes in boost pressure with changes in engine speed.
Figure 7:
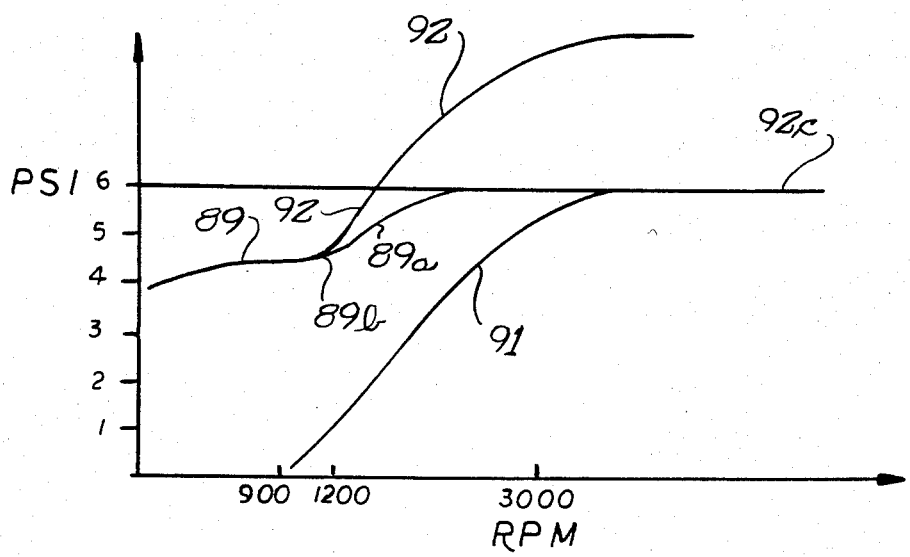
FIG. 7 is a diagramatic illustration of the prevention of an over boost condition by the use of a control valve and a wastegate valve.

Also, as will now be discussed in connection with FIG. 6a, the wastegate control means in the preferred turbocharger 14 allows the boost pressure to rise to about 6 psi at 3000 rpm along a relative constant slope line 78. FIG. 6a will be used to illustrate the operation of the preferred turbocharger 14 and it does not illustrate how the supercharger 24 performs. Without the wastegate opening, the boost pressure being provided by the system would continue at too high a boost pressure at higher engine speeds of 4000–6000 rpm, as indicated by the line segment 78c in FIG. 6a. If one were to use a turbocharger turbine having a wider turbine nozzle and lacking a wastegate relief valve the air flow and pressure would rise much slower as indicated by line 79 in FIG. 6a. A surge line 81 for the turbocharger is shown in FIG. 6a to be to the left of the line 78 along which the turbocharger is operating.

Another aspect of providing an enhanced fuel economy is thought to be achieved with the smooth transition of boost pressure to the engine and also of the net torque being developed; and this smooth transition may be assisted by a control valve means which is operated during the automatic changeover from the supercharger 24 to the turbocharger 14. FIG. 5 illustrates the projected torque from a 1.6 liter gasoline engine for a vehicle with the solid line 83 showing the projected torque when the supercharger alone is supplying the boost pressure. If a turbocharger alone were supplying boost air to the engine, the torque supplied with changes in engine speed are indicated along the dotted line 84. A smooth transition is graphically indicated in FIG. 5 by the heavy dotted line segment 82 between supercharger torque 83 at about 2500 r.p.m. and the turbocharger torque line 84. This is a result of the preferred proportioning control valve operation for smoothly blending the pressure boost between the supercharger and turbocharger so that the projected torque between the left portion of line 83 and the right portion of line 84 falls smoothly along the line 82 to the point 82a (FIG. 5). After point 82a, the projected torque is now exclusively from the turbocharger 14 along the right hand side of line 84 with the control valve 52 (FIG. 1) having finished its job and terminating the effectiveness of the supercharger 14.

Both the control valve 52 and the wastegate valve 90 cooperate to prevent an overboost condition to pressures substantially over the maximum desired boost pressure, i.e. 6 psi in this instance. That is, with reference to FIG. 7, the combination of supercharger 24 and compressor 18 may be together supplying a pressure boost of about 5.0 psi at low engine speeds as shown by the line 89 in FIG. 7. The turbocharger compressor 18 supplies very little to combined boost until about 1200 r.p.m. in this instance at which time the boost pressure from the compressor 18 rises quickly, as indicated by the line 91 in FIG. 7. The proportioning valve 52 decreases the effectiveness of the supercharger boost pressure while allowing the compressor 18 to take a larger and larger proportion of the total. That is, as the valve 52 opens, some of the pressure produced by the supercharger and present in conduit 40 (FIG. 1) is allowed to bleed off through the valve 52 and line 50. Stated differently, the valve 52 may remain closed so that the four psi being delivered over line 40 to the inlet of the compressor 18 is undiminished and is supplying all of the air pressure. As the engine speed rises from about 900 rpm, the valve 52 begins to open and becomes increasingly open as the engine speed rises to 1200 rpm. As the valve 52 progressively opens at speeds between 900 to 1200 rpm, a greater portion of the air being supplied over line 40 from the supercharger 24 is allowed to flow through the valve 52 in a direction opposite to the arrow shown in line 50. This arrow shows the direction of air flow when the supercharger is disabled. This progressive opening of the valve "bleeds off" the boost pressure being supplied from the supercharger 24. At this time, the combined boost pressure is increasing at a substantially fast rate from a point 89b (FIG. 7) at about 1200 r.p.m. along line segment 89a. Without a proportioning valve 52, the increasing boost pressure from the turbocharger compressor at about 1500 rpm to 3000 rpm, as designated on line 91 in FIG. 7 would when added to the supercharger boost pressure, as designated by the line segment 89a give a combined overboost pressure substantially above 6 psi, as designated by the line 92. But because the proportioning valve 52 and/or the wastegate operate to control the pressure at a maximum desired boost pressure the overboost condition may be avoided.

In the embodiment illustrated in FIG. 1, the control valve 52 proportions the flow of air between the supercharger 24 and the compressor 18 of the turbocharger 14 to prevent the overboost condition. As above-described, the control valve 52 may be controlled automatically by either a pressure sensitive device 45 (FIG. 13) or by the revolution counting device 46 (FIG. 1) either of which changes the position of the control valve 52 as the engine speed or boost pressure changes. In this example, changes in boost pressure between approximately 1500 and 3000 rpm, with reference to FIG. 4, opens the control valve selectively to regulate the total boost pressure.

The controlled device may take many forms for sensing the change for pressure or vehicle speed and proportioning the flow through the valve 52. With reference to FIG. 1, initially most of the air will be flowing directly through the input conduit 48 and supercharger 24 for deliver over a conduit 40 to the compressor 18 and then into the intake engine manifold 12. With the engine speed increasing, the control valve 52 will be opening increasingly as the exhaust gases from the exhaust manifold 13 turn the turbine 16 with sufficient speed and force that the compressor 18 begins to operate along the slope section 30a (FIG. 4) and line 91 (FIG. 7) at approximately 1200 rpm. As the engine speed increases, the valve 52 is opened more and more until such time it is fully opened; and, at which time, the speed sensing means 46 (FIG. 1) or pressure sensing means 45 (FIG. 13) operates the electromagnetic clutch 42 to disconnect the supercharger 24 from the engine drive so that substantially all of the air will then be flowing through the line 50 and wide open valve 52 to the compressor 18 with the full boost pressure being supplied by the compressor 18 and substantially no boost pressure being supplied by the supercharger 24. The compressor 18 will continue to supply increased air pressure until the pressure sensing actuator 107 (FIG. 9) senses 6 p.s.i. and operates wastegate valve 90 to open and to hold the pressure at a predetermined level such as 6 psig.

Figure 2:
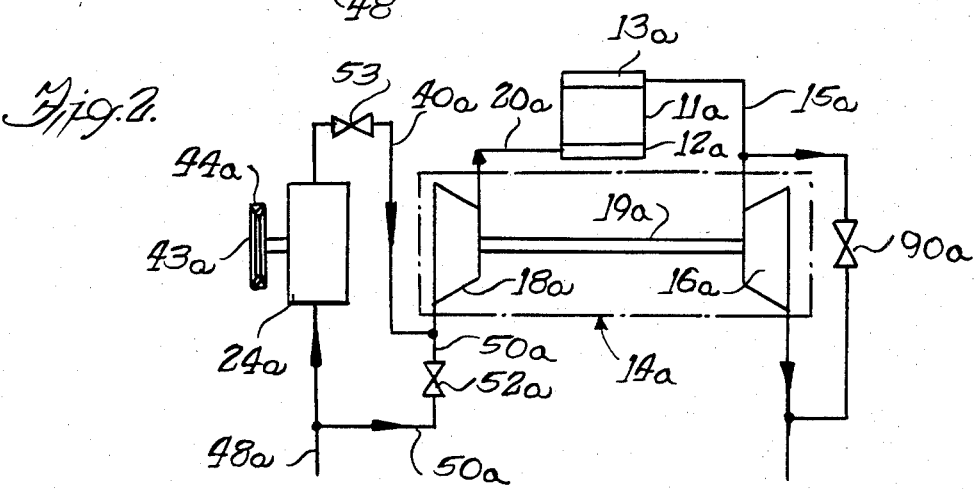
FIG. 2 is another embodiment of a supercharger and turbocharger system embodying the novel features of the invention.

In accordance with the further embodiment of the invention illustrated in FIG. 2, the clutch 42 or decoupling device, as shown in FIG. 1, has been eliminated, and instead the supercharger 24a is allowed to become freewheeling when the valve 52a is fully opened with most of the air flowing through the line 50a and into the compressor 18a of the turbocharger 14a. With this exception, the system shown in FIG. 2 is similar to the system above described for FIG. 1 and similar reference characters with a suffix "a" have been added to designate the same components in FIG. 2 that appear in FIG. 1. To prevent the air from flowing in a reverse direction through the line 40a a suitable check valve 53 is provided in the line 40a. In this embodiment in FIG. 2, the preferred blower may be a Roots kind of blower, the latter being allowed to be free running without any substantial compression of air. While economies may be realized with elimination of the electromagnetic clutch 42, additional costs may be incurred in the manufacture of the supercharger 24a to make it heavy duty to withstand higher speeds and increased wear because it will be running substantially more and faster than would be disconnected supercharger 24 as described above in connection with FIG. 1. A wastegate valve 90a opens when the turbocharger 14a is operating at the desired maximum boost pressure, e.g. at 6 psig.

Figure 3:
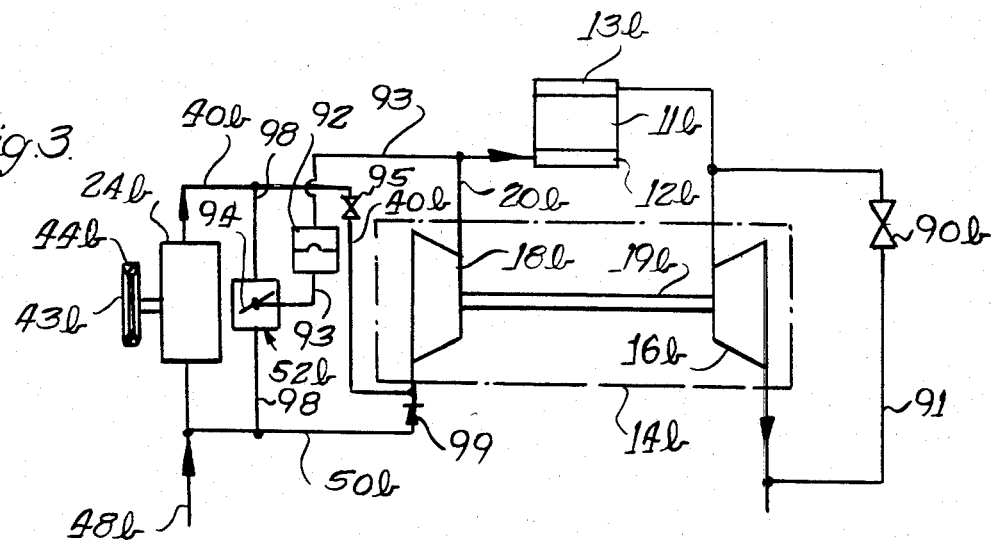
FIG. 3 is a still further embodiment of the invention embodying the novel features of the invention.

In accordance with a further embodiment of the invention to be described in connection with FIG. 3, the wastegate valve is indicated at 90b and it likewise is operational at the maximum boost pressure desired, to exhaust some gas at 91 while most of the gas is flowing through the turbocharger 14b (FIG. 3) to the turbine 16b. The supercharger 24b will initially be supplying most of the boost pressure at low engine speeds over a line 40b to the compressor 18b for flow over the line 20b to the intake manifold 12b. The pressure in the line 20b is monitored by a pressure sensitive device, such as a bellows actuated pneumatic sensor 92 having a connecting line 93 to the line 20b and operational control for operating a throttle control valve 52b which is shown with a pivoted valve throttle plate 94. As will be best understood in connection with FIG. 4, the initial boost or pressure charge will be from the supercharger, as indicated by the line 36 to the left of the surge line 35 in FIG. 4. During this initial period the compressed air charge flows from the supercharger 24b and over line 40b and through a check valve 95 to the compressor 18b for flow to the engine. As the boost pressure from the supercharger 24b becomes larger, the pressure sensitive device 92 will begin opening the throttle valve 52b to allow some backflow through the line 98 which bleeds off some of the boost pressure which would be supplied to the compressor 18b if the valve 52b were to remain closed. However, at this time, the compressor 18b will be coming up to speed and begin to supply boost pressure, as indicated by line segment 91 in FIG. 7. When the boost pressure being supplied by the combination of the supercharger 24b and the compressor 18b over the line 20b to the engine reaches a predetermined pressure, for example, about 5 psi, the proportioning valve 52b is fully opened by the pressure sensitive device 92 and this allows the supercharger 24b to become freewheeling. With continued engine speedup, the boost pressure flowing from the turbocharger 14b is allowed to increase to about 6 psi which is a maximum desired, in this example, at which time the sensing actuator 107 (FIG. 9) causes the wastegate valve 90b to open. Thus, the 6 psi boost pressure will be maintained at speeds above 3000 r.p.m. as illustrated by line segment 92c in FIG. 7. Most of the air being taken in over line 50b will go through the check valve 99 and into the compressor 18b to supply the boost pressure while the remainder of the airflow will be free flowing through the backflow loop including lines 40b, line 98, valve 52b, and the supercharger 24b.

The turbocharger 14 which is illustrated in FIG. 9 may be combined with a supercharger by air conduits and hoses or it may be modified and combined with a supercharger in a combined unit charging a common housing 120 as will be described in connection with FIGS. 10-12 hereinafter. As best seen in FIG. 10, the turbocharger 14 is attached to one end of a supercharger 24, as shown in FIGS. 10-12, to provide a compact unit which will fit into a small space in the engine compartment automobile. In addition to compactness, cost reductions can be achieved by having the same general housing 120 being used to provide turbocharger housing section 123 and supercharger housing section 122 and with internal passages within the housing used to provide alternative flow passageways for the air. Such alternative internal passage may provide the air passageways 40 to 50 described above in connection with FIG. 1. A suitable control valve 52 shown in FIG. 10 has an actuating arm assembly 121 to move a throttle valve element (not shown, but similar to valve element 94 in FIG. 3) to control airflow through an internal passage corresponding to the passage 50.

In the unit illustrated in FIG. 10, the housing 120 includes the forward supercharger housing section 122 which is of generally cylindrical shape having at its forward end the electromagnet clutch 42 and a sheave 43 which is driven by the belt 44 (FIG. 1) directly by the engine. In the unit illustrated in FIG. 10 all of the air flows into a rectangular cross section air inlet 124 (FIGS. 10 and 11) for flow into the supercharger. The supercharger compresses the air and delivers the same through its internal passageway leading to the central air inlet 125, as is shown in FIG. 9 for the turbocharger. All of the air entering this turbocharger inlet 125 passes through the turbocharger impellor chamber 127 (FIG. 9) and discharges from an air outlet 128 (FIGS. 10-12) and turbocharger housing section 123. Even at low initial engine speeds when the turbocharger is not yet compressing air, all of the air being compressed from the supercharger is directed through the compressor housing section 123 and through the impellor chamber 127 (FIG. 9) for discharge from the outlet 128 which is connected by the line 20 to the engine. When the compressor 18 of the turbocharger is operating, it will also be compressing the air prior to its being discharged from the outlet 128. As described above in connection with FIG. 9, the wastegate valve actuator 107, shown in FIG. 10, operates a wastegate valve 115 (FIG. 12) to allow the bypass gas to flow outwardly therefrom as well as from its central gas discharge opening 132. The central gas discharge opening 132 is at the rear of the turbocharger housing section 123.

In this instance, the turbocharger housing section 123 of the combined unit is preferably enlarged at its compressor section 133 (FIG. 10) from that of a usual and conventional compressor housing, such as shown in FIG. 9, in order to supply all of the air to the engine at maximum loads and maximum speeds. For the reasons above explained, the wastegate valve 115 in the combined unit shown in FIGS. 10-12 has been decreased in size. The housing section 122 for the supercharger has been sized so that only approximately one-fourth of the maximum airflow need be ever compressed therein and hence its size may be reduced from that needed for a supercharger which would supply all of the air.

It will be appreciated that the above-description has been given primarily with respect to an acceleration condition in which the engine is accelerating in speed from a very low speed, e.g., 1000 rpm to a high speed, e.g. 3000 rpm, and above. The system, of course, works in the reverse direction. From the foregoing it will be seen that the present invention provides a new and improved combination of a supercharger and turbocharger operating in accordance with a method which will conserve fuel and which will provide increased torque at low engine speeds so that a smaller engine may act as a larger engine. The supercharger is associated with the compressor of the turbocharger to maximize both of their respective efficiencies such that when the supercharger becomes less efficient, it is disabled either by being declutched from the engine power drive or by being free wheeling so that there is no substantial power loss being dissipated by the supercharger drive. The smooth transition or blending of the net torque from the engine and also of the compressed air charge to the engine is provided by proportioning valve which gradually phases out the supercharger boost pressure while phasing in the boost pressure from the turbocharger compressor. For control purposes, a pressure sensing device may be used to cut out the supercharger at a predetermined pressure level, for example 5 psi, and to then allow the turbocharger to produce additional boost pressure until the maximum pressure, for example 6 psi, at which time a wastegate valve may be opened to maintain a relatively constant maximum boost pressure at high engine speeds.

It is to be understood that the drawings and illustrations herein, as well as the specific pressures, airflows, engine speeds, etc. are by way of example only and are not by way of limitation of the scope or purview of the present invention. The invention is particularly useful for automotive use and the examples given herein as well as the illustrations given herein relate to automotive use, but the claims in scope of the present invention are entitled to cover other uses beyond that of use in or for vehicles. Further, it is to be understood that the compressed air charge being supplied to the engine from the turbocharger compressor need not directly flow to the engine but may flow first through an air cooler to lower the temperature of the compressed air charge being supplied to the engine, and still fall within the purview of the claims of the present invention.

While a preferred embodiment has been shown and described, it will be understood that there is no intent to limit the invention by such disclosure, but rather, it is intended to cover all modifications and alternate construction falling within the spirit and scope of the invention as defined in the appended claims.

What is claimed is:

1. The combination comprising:

an internal combustion engine having an air intake to receive a charge of compressed air and an exhaust outlet for discharging exhaust gases, a turbocharger having a compressor for compressing air and connected to the air intake to supply a compressed air charge thereto, a turbine in said turbocharger connected to and driven by exhaust gases from the exhaust outlet of the engine and driving the compressor to compress air, means to control the turbocharger to limit the pressure of the compressed air charge to below a predetermined pressure at high engine speeds, a positive displacement compressor having an air inlet and an air outlet with the outlet being connected to the inlet of turbocharger compressor to compress air and to supply compressed air to the inlet of the turbocharger compressor at low engine speeds, direct drive means driven by the engine and selectively operable to drive the positive displacment means and being selectively disabled, and control means for limiting the combined air pressure being supplied when both compressors are operating to below the predetermined pressure level and to effectively disable the direct drive means and the positive displacement compressor from compressing air when the turbocharger is supplying a compressed air charge at a desired pressure level.

2. The combination of claim 1 in which the means to control the turbocharger comprises a wastegate valve and an actuator therefor to open the valve to reduce the force from the gas being applied to turbine.

3. The combination in accordance with claim 1 in which the control means for limiting the combined air pressure comprises a valve means connected between said positive displacement compressor and said turbocharger compressor and an actuator for progressively opening the valve to reduce the amount of compressed air being supplied to the turbocharger compressor as the latter produces more and more compressed air charge for the engine.

4. An apparatus in accordance with claim 1 in which said direct drive means between the engine and the positive displacement compressor includes a clutch which releases to disable the drive means for the positive displacement compressor when the turbocharger compressor is supplying the air charge to the engine at a predetermined level of supercharge.

5. The combination in accordance with claim 1 in which the control means includes a valve and a flow path conduit connected between the air inlet and air outlet of the positive displacement compressor with the valve being opened to free wheel the positive displacement compressor so as not to apply an appreciable resistance to the engine at higher speeds.

6. A combination in accordance with claim 1 in which the control means for limiting the combined air pressure includes means for sensing the pressure of the air charge being supplied to the engine, valve means connected to the pressure sensing means and operable thereby to proportionally and progressively open the valve means and to reduce the pressure of the air being supplied from the positive displacement compressor to the turbocharger compressor as the engine speed is increased from a low engine speed.

7. A combined turbocharger and supercharger apparatus for delivering a compressed air charge to an engine, said apparatus comprising:
   a supercharger having an internal compressor for compressing air,
   a turbocharger having a compressor and a turbine driven by exhaust gases from an engine to turn the compressor,
   a combined unit housing including a supercharger housing section having an air inlet for receiving air for flow through the supercharger,
   an air outlet from the supercharger housing section,
   a direct drive at one end of the supercharger housing for connection to an engine to drive the supercharger,
   a compressor housing section adjacent an end of the supercharger housing section opposite the supercharger direct drive and receiving air flowing through the outlet of the supercharger,
   an air outlet from the compressor housing section for delivering a compressed air charge compressed by either the supercharger or jointly by the supercharger and compressor,
   a turbine housing section combined with the compressor housing section at said turbocharger,
   a wastegate valve means in said turbine housing section movable to an operative position for regulating the maximum pressure of the engine gas being used to operate the turbine, and
   an actuator for the wastegate valve means to shift the latter from an inoperative to an operative position.

8. An apparatus in accordance with claim 7 including means for disabling the supercharger from delivering a substantial charge of air when the turbocharger is operating at its full extent.

9. An apparatus in accordance with claim 7 in which said direct drive means comprises a clutch mounted on the compressor housing section.

10. For use with an internal combustion engine having an air intake and a gas exhaust system, the combination comprising:
    a turbocharger having a turbine connected to the engine and driven by exhaust gases from the engine,
    a first air compressor driven by the turbine to supply a compressed air charge to the engine air intake,
    a wastegate valve associated with the turbine and movable to an open position to allow exhaust gas flow therethrough to limit the maximum pressure of the compressed air charge being supplied to the engine air intake,
    means for sensing the pressure of the compressed air charge and for operating the wastegate valve means to its open position,
    a positive displacement second air compressor for compressing air and having an air duct connected to and delivering a compressed air charge to the first air compressor for flow therethrough to the engine air intake, air conduit means extending from the outlet of said second air compressor to the inlet of said first air compressor,
    a direct drive means driven by the engine and extending to the second air compressor to drive the same over a predetermined speed range,
    means for disabling the second air compressor from delivering its air charge when the air pressure of the compressed air charge is at a predetermined pressure below the maximum pressure so that at pressures above the predetermined pressure the first air compressor is delivering substantially all of the compressed air charge to the engine,
    a common air inlet means to the first and second air compressors,
    control means including valve means controlling air flow to and through said air inlet means to proportion the air flow to said first and second compressors with increased air flow being directed into and through the first compressor as the pressure of the compressed air charge rises to approach the predetermined pressure,
    said valve means being disposed between said air conduit means and said common air inlet means to control the flow of air and to bleed off the pressure of the compressed air charge being delivered by said second compressor to the first compressor means,
    said control means comprising pressure sensing means to sense the discharge pressure of the compressed air charge from the first compressor and said valve means being operable by said pressure sensing means to open and to allow airflow through the valve means to recirculate through the second air compressor when the air charge pressure is at or above the predetermined pressure.

* * * * *